US006817248B1

United States Patent
Hanada (10) Patent No.: US 6,817,248 B1
(45) Date of Patent: Nov. 16, 2004

(54) HUMAN LUMBAR MODEL STRUCTURE CAPABLE OF OBTAINING STABILIZED DESIRED DATA AND METHOD FOR FABRICATING THE SAME

(76) Inventor: Keiichi Hanada, 3-51-2-3-407, Kojima-cho, Chofu-shi, Tokyo (JP)

(*) Notice: Subject to any disclaimer, the term of this patent is extended or adjusted under 35 U.S.C. 154(b) by 2 days.

(21) Appl. No.: 10/445,465

(22) Filed: May 27, 2003

(51) Int. Cl.$^7$ ................................................ G01L 7/00
(52) U.S. Cl. ...................................................... 73/714
(58) Field of Search ...................... 73/714, 756; 623/17, 623/18, 20; 606/53–71

(56) References Cited

U.S. PATENT DOCUMENTS 6,311,562 B1   11/2001   Hanada ........................ 73/714

OTHER PUBLICATIONS

K. Hanada, "A New Measurement Method for Quantifying the Ride Comfort", SAE International Conference, Detroit, 2002–01–1236, Mar. 2002 (corresponds to US patent No. 6,311,562).

K. Hanada, "Comparison of Vibrational Ride Discomfort Between Various Cars by New Quantitative Ride Discomfort Meter", SAE Noise & Vibration Conference & Exposition, Travers City, Michigan, 2003–01–1687, May 2003.

Primary Examiner—William Oen
(74) Attorney, Agent, or Firm—Collard & Roe, P.C.

(57) ABSTRACT

An abdominal/back muscle member 19 tightly surrounds narrowed portions 172 and 182 of an upper and a lower body members 17 and 18 of a lumbar assembly of human lumbar model structure. Shoulders 173 and 183 are formed at the bounds of the narrowed portion 172 and 182 from the remaining upper and lower portions of the upper body member and the lower body member 17 and 18 with a radial height larger than the thickness of the abdominal/back muscle member 19 to form hood-like radial flanges protruding from the outer upper and lower edges of the muscle member. The hood-like radial flanges effectively prevent the upper and lower edges of the muscle 19 from going over the shoulders, even if the maximum vertical loading is applied to the structure. In the human lumbar model structure, a lower element 112 of an upper lumbar member 11 is formed with a penetration path 34, which axially extends therein and communicates with an inner cavity of an annulus fibrosus member 13 filled with the nucleus pulposus liquid 16 inside. The liquid can overflow the penetration path until the pressure of the nucleus pulposus liquid 16 becomes to an appropriate value.

5 Claims, 5 Drawing Sheets

HUMAN LUMBAR MODEL STRUCTURE CAPABLE OF OBTAINING STABILIZED DESIRED DATA AND METHOD FOR FABRICATING THE SAME

BACKGROUND OF THE INVENTION

This invention relates to a human lumbar model structure for simulating a pressure applied to nucleus pulposus in a human lumbar and a method for fabricating the structure.

In order to estimate and evaluate a ride vibration comfort which would be felt by a human being (an occupant, a driver, a passenger, etc.) on a vehicle such as a motor vehicle, bulldozer, a train, a vessel, and a spacecraft travelling with vibration, variation in speed, and/or change of acceleration, sensory tests have only been used. However, the test results widely fluctuate among individuals. Thus, no basis for objective, persuasive, or quantitative evaluation of vehicles in the ride vibration comfort has been established yet.

Long-distance or long-time drivers often suffer from herniation of a lumbar intervertebral disk. According to one of the most convincing theories accepted by many orthopedists, the occurrence and the aggravation of the above-mentioned hernia are correlated with ride vibration discomfort when travelling in motor vehicles.

The lumbar region of the vertebral column of a human body comprises five vertebrae, that is, 1st lumbar vertebra, 2nd lumbar vertebra, 3rd lumbar vertebra, 4h lumbar vertebra, and 5th lumbar vertebra arranged in the order from upside to down side. There is the lumbar intervertebral disk between each two adjacent lumbar vertebrae. The vertebral column has the nucleus pulposus therein. The herniation readily occurs at the lumbar intervertebral disk between 4th and 5th lumbar vertebrae in comparison with the other lumbar intervertebral disks.

In order to make it possible to objectively and quantitatively evaluate ride vibration comfort which is the cause of suffering from herniation of the lumbar intervertebral disk, U.S. Pat. No. 6,311,562 (B1), which was issued on Nov. 6, 2001 to the same inventor of the present invention, discloses a human lumbar model structure for simulating pressure applied to nucleus pulposus in the lumbar spine of a human body.

The present inventor made a sample of the human lumbar model structure according to the embodiment of FIG. 6 in the US patent and subjected to tests. The sample structure will briefly be described with reference to FIG. 1.

Figure 1:
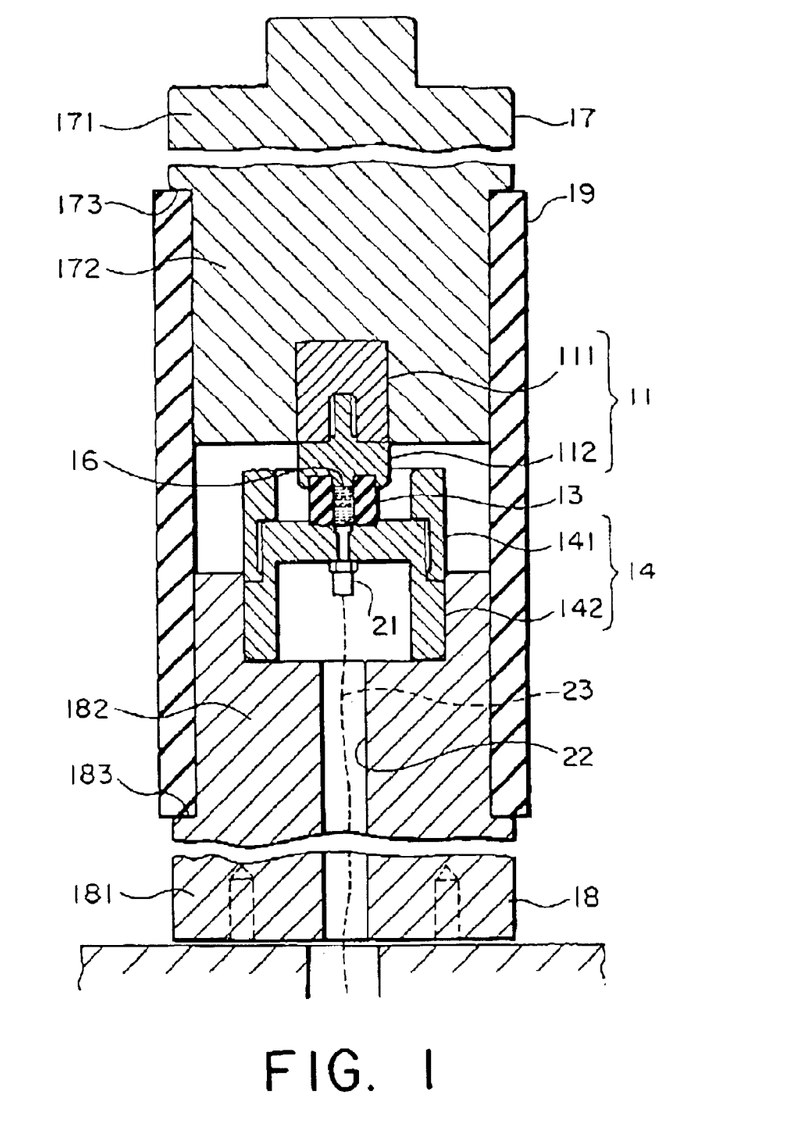
FIG. 1 shows a vertical sectional view of a human lumbar model structure known in the prior art.

The sample of the human lumbar model structure shown in FIG. 1 comprises a cylindrical lumbar assembly and an abdominal/back muscle member. The,lumbar assembly comprises an upper body member 17, an upper lumbar member 11 corresponding to a lumbar vertebra such as the fourth lumbar vertebra, an annulus fibrosus member 13 corresponding to the nucleus puplosus, nucleus pulposus agent or liquid 16 in the annulus fibrosus member 13, a lower lumbar member 14 corresponding to an adjacent lumbar vertebra such as the fifth lumbar vertebra, and a lower body member 18. These members are formed in a cylindrical shape, coaxially arranged around a common center axis and are vertically superposed from top to bottom in this order.

The abdominal/back muscle member shown at 19 is made of an elastic material and has a hollow cylindrical shape. The abdominal/back muscle member 19 surrounds and tightens the lumbar assembly over at least a center area of a narrowed portion thereof extending from the midlevel of the upper body member 17 to the midlevel of the lower body member 18. In detail, the upper body member 17 comprises an upper portion 171 and a narrowed portion 172 as its lower portion with a reduced diameter and has a shoulder 173 on its outer surface at a bound between the narrowed lower portion 172 and the upper portion 171. Similarly, the lower body member 18 comprises a lower portion 181 and a narrowed portion 182 as its upper portion with a reduced diameter and ahs a shoulder 183 on its outer surface at a bound between narrowed upper portion 182 and the lower portion 181. When the abdominal/back muscle member 19 is attached to the lumbar assembly, it tightly surrounds the narrowed portions 172 and 182 and has an inner diameter equal to the diameter of the narrowed portions 172 and 182 but has an outer diameter larger than an outer diameter of the upper portion 171 of the upper body member 17 and the lower portion 181 of the lower body member 18. Thus, the shoulders 173 and 183 serve as stoppers against axial or radial movement of the abdominal/back muscle member 19.

The upper lumbar member 11 comprises an upper element 111, which is formed in a circular columnar block and tightly fitted into a bottom surface of the upper body member 17, and a lower element 112, which is a circular disk shape and threaded into a bottom surface of the upper element 111. And the lower lumbar member 14 comprises an upper element 141 in a ring form and a lower element 142 in a cylindrical form with an upper dosed end. The upper element 141 is threaded onto the upper outer surface of the upper lower element 142. The lower element 142 is tightly fitted into an upper surface of the lower body member 18, and is provided with a pressure sensor 21 as a pressure transducer therein on a common center axis position. A signal cable 23 from the pressure sensor 21 is lead out through a vertical guide hole 22 formed in the lower body member 18. The annulus fibrosus member 13 is made of a full hard and elastic material and has a flexible structure with thickish and annular form. The annulus fibrosus member 13 is disposed between the lower element 112 of the upper lumbar member and the lower element 142 of the lower lumbar member and tightly fitted at opposite ends to the both lower elements 112 and 142. The annulus fibrosus member 13 is disposed in the ring-shape upper element 141 of the lower lumbar member 14. By this structure, an inner cavity is formed in the annulus fibrosus member 13 and is filled with the nucleus pulposus liquid 16 which is liquid as an artificial nucleus pulposus therein.

A loading member modeling the upper half of a human body is arranged on the top surface of the human lumbar model structure composed by fabricating above-mentioned. The ride vibration comfort or discomfort is evaluated by recording results of detecting instantly and continuously changes of the output voltage of the pressure sensor 21 when the human body fluctuates. For this purpose, the completed human lumbar model structure was subjected to a static loading test in which data are recorded about changes of pressure obtained from the nucleus pulposus member 16 by the increase and the decrease of the vertical loading onto the model structure.

Figure 2:
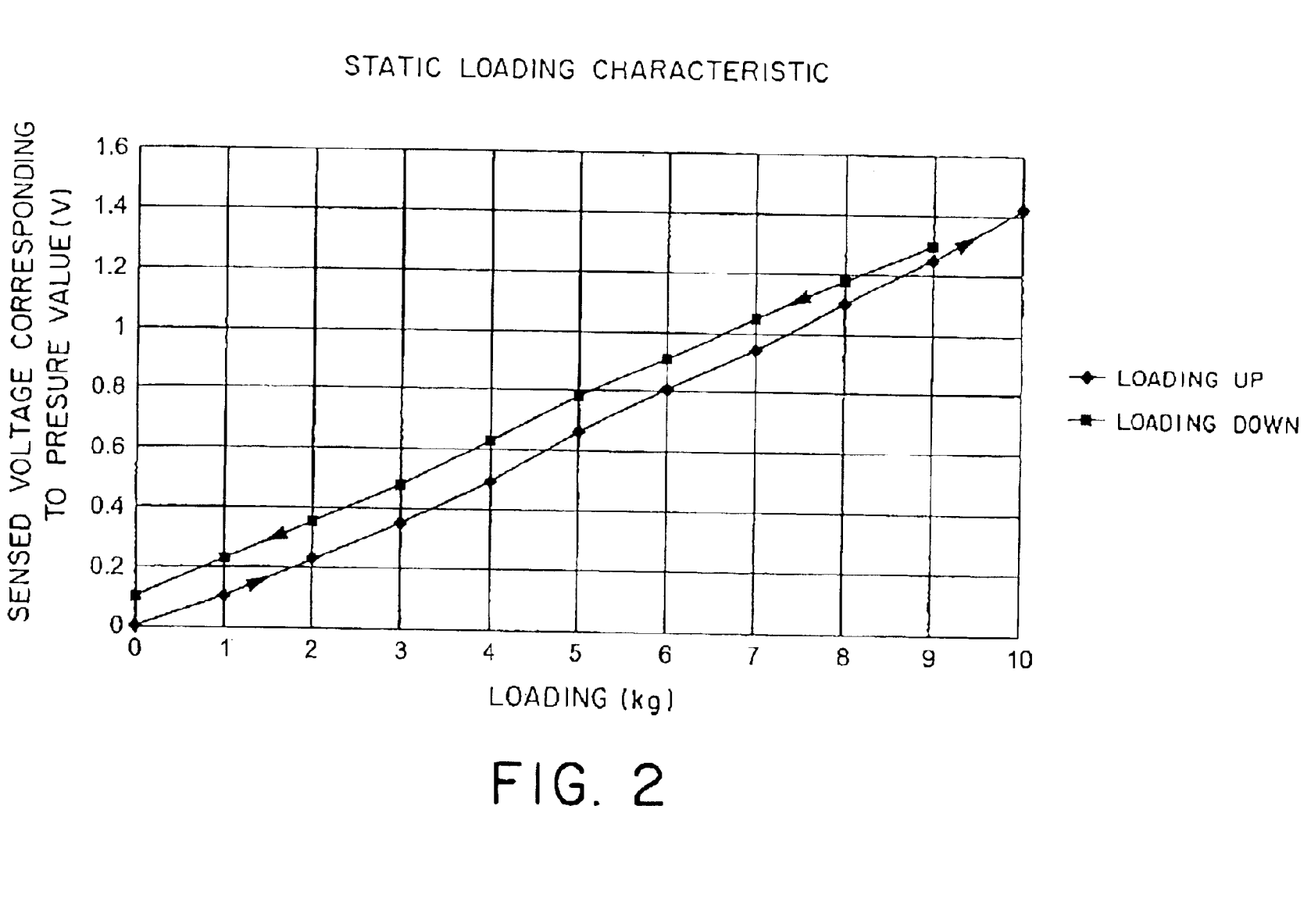
FIG. 2 shows an experimental test result of static loading characteristic obtained from the human lumbar model structure illustrated in FIG. 1.

However, as results of the static loading experiment, as shown in FIG. 2, we have found out a hysteresis phenomenon and non-linearity between pressure values obtained for loading up gradually and for loading down gradually from the value loaded once. This means that pressure fluctuation characteristic measured is not constant but unstable at different tests. Further, the same pressure value cannot be obtained for the re-assembling model after the model structure was disassembled. This means that the results of the measurements are not constant but unstable at every model structures assembled or reassembled.

Accordingly, we had various experiments so as to search reasons that cause the problems such as the hysteresis phenomenon, non-linearity and unstability. As the result, we found out the followings. When a vertical loading is applied to the human lumbar model structure, the abdominal/back muscle member 19 is distorted so that upper edge and the lower edge of the muscle member 19 go over the shoulders 173 and 183 to move onto the upper portion 171 of the upper body member 17 and the lower potion 181 of the lower body member 18. The edge going-over phenomenon is one of reasons causing the problems, the present inventor considered. There is difference in contact forces with the upper body member 17 and the lower body member 18 and also in the internal stresses between portions of the muscle member 19 remaining on the upper and lower portions 171 and 181 of the upper and the lower body members 17 and 18 and edge portions going over the shoulders 173 and 183 onto the narrowed portions 172 and 182. The internal stress difference or internal stress distribution affects restoration of the muscle member 19 when the muscle member 19 is relaxed from the loading. Accordingly, there appears the hysteresis between increase and decrease of the loading. Further, an amount of the edge going-over irregularly varies dependent on increase of the loading. Accordingly, the hysteresis is not constant over a range of loading varied. Accordingly, the restoration is not linear over the range of loading varied. Further, the amount of the edge going-over changes in tests repeated. Accordingly, the static lading characteristic is not constant in tests repeated. This means that the test results using the model structure are unstable.

In the fabrication processes of the model structure, the annulus fibrosus member 13 is put on the lower element 142 and in the upper ring element 141 of the lower lumbar member 14. The nucleus pulposus liquid 16 such as grease is filled in the inner cavity of the annulus fibrosus member 13, and then the lower element 112 of the upper lumbar member 11 is fit and tightened onto an upper portion of the annulus fibrosus member 13. In this fabricating process, no reappearance is not insured in the pressure of the nucleus pulposus liquid 16 filled in the inner cavity of the annulus fibrosus member 13. Further, any gas and/or liquid may possibly mixed in the nucleus pulposus liquid 16. These cause unstability that measurement values of the pressure variation change in every model structures assembled or reassembled, the present inventor considers.

SUMMARY OF THE INVENTION

It is therefore an object of the present invention to provide a human lumbar model structure which can obtain a stable pressure variation characteristic in a static loading test and stably measuring pressure changes applied to the nucleus pulposus agent of an artificial nucleus pulposus.

It is another object to provide a method for fabricating the human lumbar model structure.

According to this invention, a human lumbar model structure for simulating pressure applied to nucleus pulposus in the lumbar spine of a human body is obtained. The structure comprises a cylindrical lumbar assembly having an upper body member, an upper lumbar member, an annulus fibrosus member, a lower lumbar member, and a lower body member, which are coaxially arranged around a common center axis and which are superposed vertically from top to bottom in this order. The upper body member comprises a first upper portion having a first diameter and a first lower portion having a second diameter smaller than the first diameter to form a first shoulder portion around the bound between the first upper portion and the first lower portion. The lower body member comprises a second upper portion having a third diameter and a second lower portion having a fourth diameter larger than the third diameter to form a second shoulder portion around the bound between the second upper portion and the second lower portion. The annulus fibrosus member comprises a thick cylindrical ring made of a hard elastic material and having upper and lower parts fitted into the upper and lower lumbar members, respectively. The fibrosus member has an inner cavity filled with a liquid the nucleus pulposus. An abdominal/back muscle member tightly surrounds the lumbar assembly and is made of an elastic material in a hollow cylindrical shape. The abdominal/back muscle member has an upper and lower cylindrical portion fitted onto the first lower portion of the upper body member and the second upper portion of the lower body member, respectively, so that the abdominal/back muscle surrounds and tightens the lumbar assembly over a center area extending from the first shoulder portion of the upper body member to the second shoulder portion of the lower body member, the abdominal/back muscle member having an outer diameter smaller than the first diameter and the fourth diameter when no vertical loading is applied to the lumbar model structure. A pressure sensor as a pressure transducer is provided to be arranged along a center axis of the lower lumbar member in direct contact with the liquid as the nucleus pulposus for detecting the variation of the pressure of the liquid in the fibrous member.

According to the human lumbar model structure, the first and second shoulder portions form the hood-like radial flanges radially outwardly protruding over the outer edges of the abdominal/back muscle member to prevent the upper and lower edges of the abdominal/back muscle member from going over the first and second shoulders to move onto the upper portion of the upper body member and the lower portion of the lower body member.

Accordingly, the human lumbar model structure of this invention can provides stabilized static loading characteristic with linearity and no hysteresis.

According to another aspect of this invention, the human lumbar model structure has a penetration path in the lower element of the upper lumbar member, the penetration path upwardly extends from the inner cavity of the annulus fibrosus member in the axial direction to open in a top surface of the lower element of the upper lumbar member. In the fabrication of the human lumbar model structure, the nucleus pulposus liquid in the cavity can overflow the upper opening of the penetration path and can reach a stable condition having a predetermined pressure value. Accordingly, the human lumbar model structure can provide test data stabilized.

The human lumbar model structure according to this invention can be fabricated by the following method, which comprises steps of:

tightly fitting the lower lumbar member with the pressure sensor into an upper surface of the second upper portion of the lower body member;

tightly fitting the annulus fibrosus member to the lower lumbar member;

filling the liquid as the nucleus pulposus into the inner cavity thereof;

tightly fitting the lower element of the upper lumbar member to the upper portion of the annulus fibrosus member;

making the liquid overflow from an upper opening of the penetration path of the lower element;

tightly fitting the upper element of the upper lumbar member to the lower element of the upper lumbar member;

tightly fitting the lower portion of the abdominal/back muscle member onto the second upper portion of the lower body member; and tightly fitting the upper body member to the upper element of the upper lumbar member, while the first lower portion of the upper body member being fitted into the upper portion of the abdominal/back muscle member.

DESCRIPTION OF PREFERRED EMBODIMENT

Figure 3:
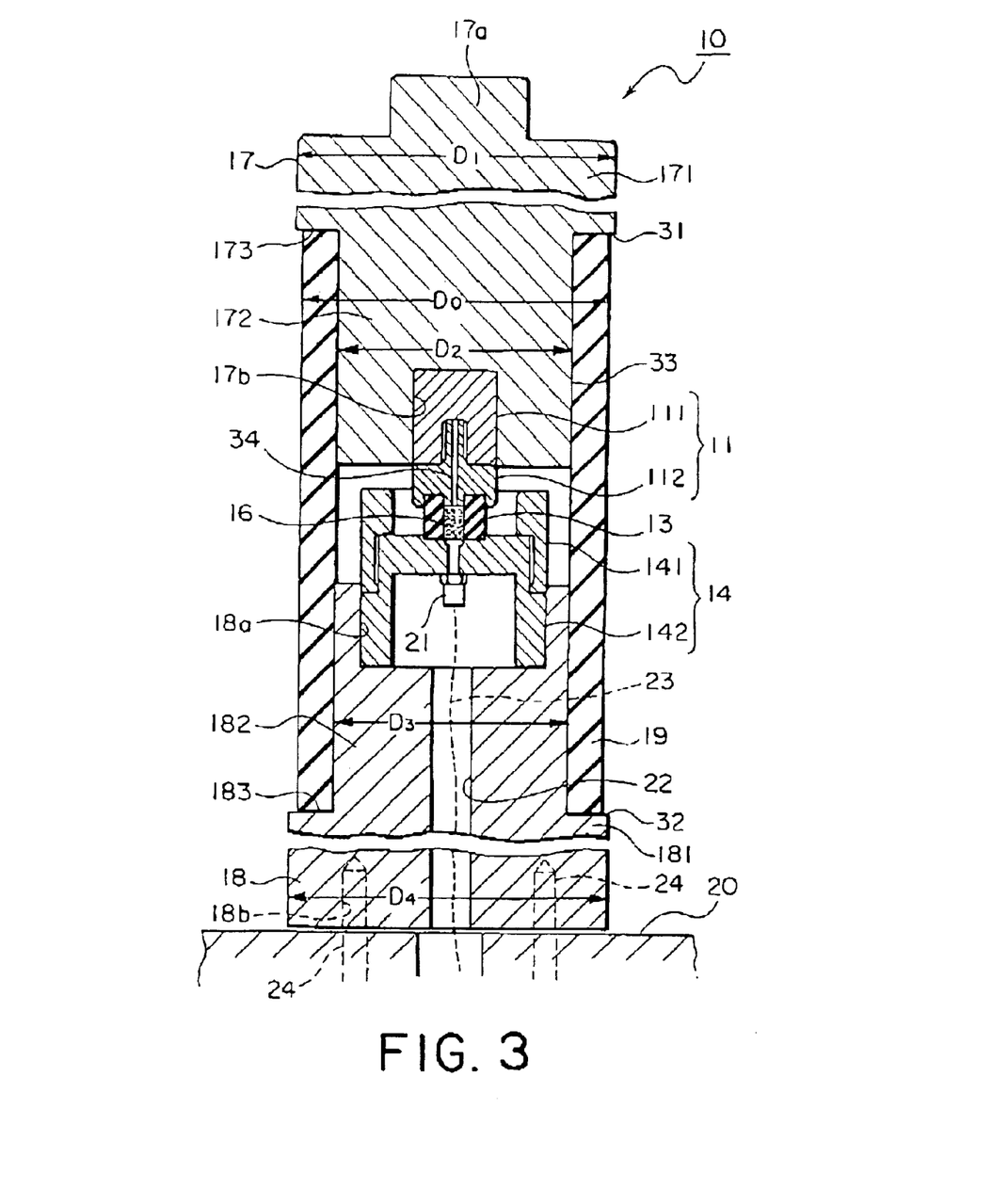
FIG. 3 shows a vertical sectional view of a human lumbar model structure according to an embodiment of this invention.

Referring to FIG. 3, the human lumbar model structure 10 shown therein is one according to an embodiment of this invention and similar to the human lumbar model structure known in the prior art shown in FIG. 1, except for the differences described below. In FIG. 3. similar parts are represented by the same reference numerals in FIG. 1 and description thereto are omitted for the purpose of simplification of the description.

With respect to a difference from the prior art structure shown in FIG. 1, the outer diameter Do of the abdominal/back muscle member 19 is relatively smaller than any one of the outer diameter D1 of the upper portion 171 of the upper body member 17 and the outer diameter D4 of the lower portion 181 of the lower body member 18. It is needless to say that the outer diameters D2 and D3 of the narrowed lower and upper portions 172 and 182 of the upper and lower body members 17 and 18 are smaller than the outer diameters D1, D4 and Do of the upper and lower portions 171 and 181 of the upper and lower body members 17 and 18 and the abdominal/back muscle member 19. Usually, the diameters D2 and D3 are made equal to one another and also are equal to an inner diameter of the abdominal/back muscle member 19 fitted on the lower and upper portions 172 and 182 of the upper and lower body members 17 and 18. The diameter D1 of the upper portion 171 of the upper body member 17 also is usually equal to the diameter D4 of the lower portion 181 of the lower body member 18.

According to the relationship of various sizes or diameters described above, the upper and lower shoulders 173 and 174 have hood-like flanges or shed-roofs 31 and 32 protruding outwardly from the opposite outer edges of the abdominal/back muscle member 19. The hood-like radial flanges 31 and 32 have a radial space size that is determined by the difference between the diameter D1 (=D4) and Do.

In other words, the cylindrical lumbar assembly is formed with an annular recess portion 33 around the assembly and axially extending between the upper and lower shoulders 173 and 183. The abdominal/back muscle member 19 is tightly fitted in the annular recess portion 33. The annular recess portion 33 has a radial depth larger than the radial wall thickness of the abdominal/back muscle member 19.

Comparing with the shoulders 173 and 183 of small radial heights in the prior art structure in FIG. 1, the hood-like radial flanges 31 and 32 effectively stop movement of the upper and lower edges of the abdominal/back muscle member 19 going over the shoulders 173 and 183, even when the vertical loading is applied to the human lumbar model structure. It is not required that the height of the hood-like radial flange 31 and 32 is very large, but it is necessary to have a size sufficient to prevent the edge of the abdominal/back muscle member 19 from going over the shoulder to move onto the upper portion 171 and the lower portion 181 of the upper body member 17 and the lower body member 18, when the vertical loading is applied to the human lumbar model structure 10.

Another difference from the prior art structure is that a penetration path 34 is formed in the lower element 112 of the upper lumbar member 11 along the central axis of the lower element 112.

Next, referring to FIGS. 3 and 5, description will be made of the penetration path 34, the annulus fibrosus member 13, the upper lumbar member 11 and the lower lumbar member 14.

As illustrated, the upper element 111 of the upper lumbar member 11 has a cylindrical shape and has a threaded hole 111a extending from the center of its bottom surface upward in an axial direction. A bottom of the threaded hole 111a forms a plane so as to shut up a liquid exit of the penetration path 34 of the, lower element 112, as will later be described.

The lower element 112 comprises a cylindrical disk portion and a threaded portion 112a protruding upward from the center of the top surface of the cylindrical disk portion. The penetration path 34 extends from the bottom surface to the top end of the threaded portion 112a along the central axis. The lower element 112 fixes a shutting tape 30 on the top end of the threaded portion 112a to thereby close a top opening, as a liquid exit, of the penetration path 34. The lower element 112 is fixed to the upper element 111 by screwing the threaded portion 112a with a narrow gap for a ceiling of the threaded hole 111a. The lower element 112 is also provided with an annular groove 112b formed in its bottom surface to be coupled with the annulus fibrosus member 13. The lower element 112 is put on the fibrosus member 13 with an upper end of the fibrosus membe 13 being fitted into the annular groove 112b. In the state, a lower opening of the penetration path 34 communicates with the inner cavity of the fibrosus member 13, so that the nucleus pulposus liquid 16 filled in the inner cavity rises up in the penetration path 34 and may overflow through the top opening as the liquid exit of the penetration path 34. This is because a central projection 112c, which defines an inner wall of the annular groove 112b, partially invades into the inner cavity of the fibrosus member 13.

Figure 5:
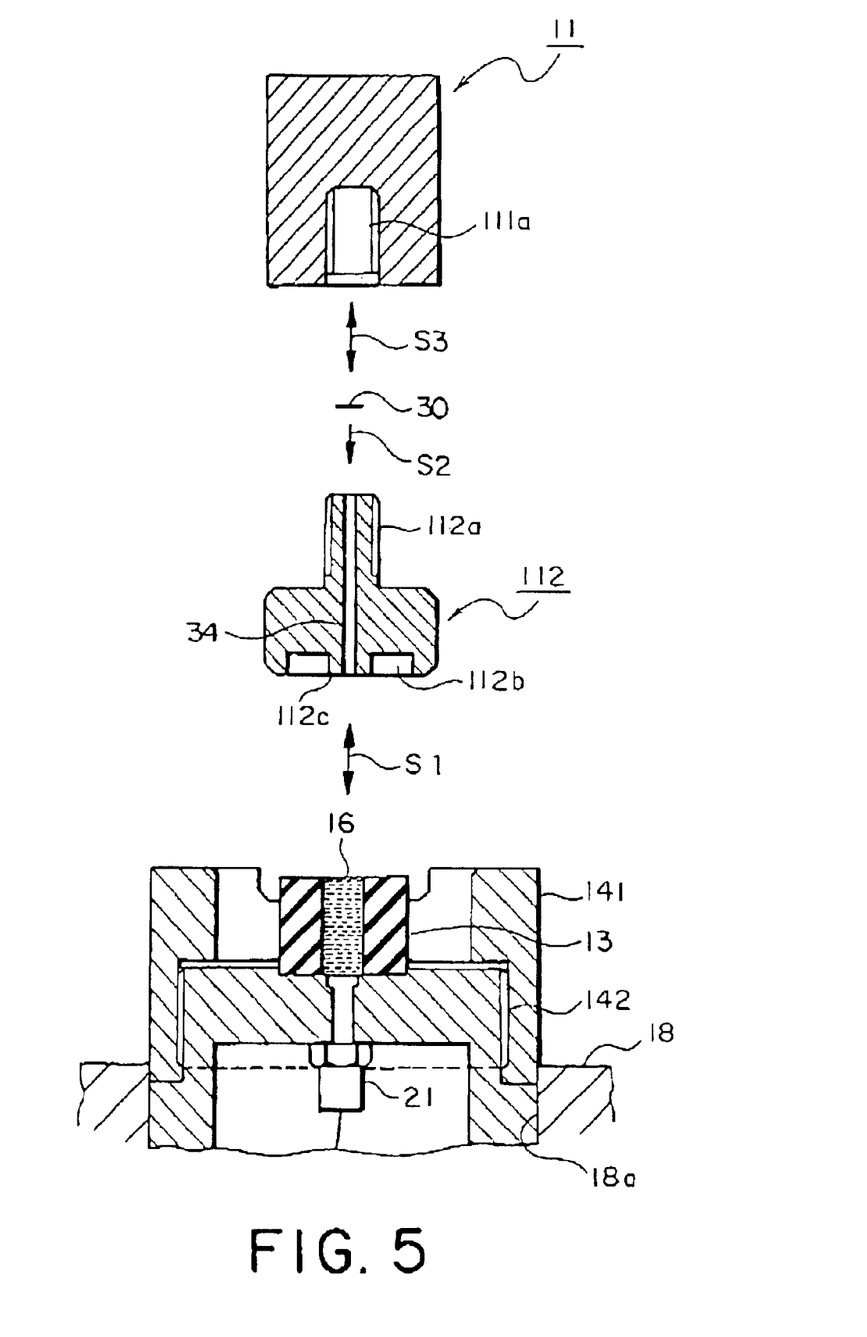
FIG. 5 shows a perspective view of a main portion in the human lumbar model structure of FIG. 3, being in an assembled state for explaining fabricating steps of the structure.

The arrangement of the annulus fibrosus member 13, the upper element 141 and the lower element 142 of the lumbar member 14, and the lower body member 18 illustrated in FIG. 5 is similar to that described above referring to FIG. 1.

In order to experimentally simulate a human body, A sample of the human lumbar model structure is produced according to this invention. In the sample, the upper and lower elements 111 and 112 of the upper lumbar member 11, which is corresponding to the fourth lumbar vertebra, have cylindrical shapes with heights of about 50 mm and 20 mm, and outer diameters of about 33 mm and 32 mm, respectively. The threaded portion 112a has a height of about 25 mm. The annular groove 112b has a depth of about 4 mm and a width such that the annulus fibrosus member 13 fits therein. The penetration path 34 has a diameter of about 2 mm.

The annulus fibrosus member 13 has an outer diameter of about 24 mm, a thinness of about 15 mm, and a height of about 20 mm. The inner cavity of the annulus fibrosus member 13 has an inner diameter of about 9 mm and is filled with silicone grease as the nucleus pulposus liquid 16. The upper element 141 of the lower lumbar member 14, which is corresponding to the fifth lumbar vertebra, has a height or length of about 50 mm and an outer diameter of about 33 mm. The lower element 142 of the lower lumbar member 14 has a height or a length of approximately 49 mm. The lower element 142 comprises an upper part having an outer diameter of about 56 mm and a height or a length of about 22 mm, and a lower part having an outer diameter of about 70 mm and a remaining height or length of about 27 mm.

Now, returning to FIG. 3, the upper body member 17 has a cylindrical body with an outer diameter (D1) of about 120 mm at the upper portion 171 and a height or length of about 155 mm. The upper body member 17 is provided with a coupling protrusion 17a formed on its top surface to be coupled with an upper portion of a loading member, and a coupling hole 17b open at its bottom surface to receive the upper element 111 of the upper lumbar member 11. The coupling hole 17b has an inner diameter of about 33 mm and a depth of about 35 mm. Over the height of about 80 mm from the bottom surface, the upper body member 17 has the narrowed lower portion 172 having the smaller outer diameter D2 of about 96 mm. The lower portion 172 receives the upper end portion of the abdominal/back muscle member 19 on its cylindrical outer surface.

The lower body member 18 has a cylindrical body with an outer diameter (D4) of about 120 mm at its lower portion 181 and a height or length of about 180 mm. The lower body member 18 is provided with a coupling hole 18a formed in its top surface to receive the lower element 142 of the lower lumbar member 14, and threaded holes 18b open at its bottom surface to be engaged with bolts 24 for securely fastening the lower body member 18 to the base 20. The coupling hole 18a has an inner diameter of about 70 mm and a depth of about 30 mm. Over the height from the top surface to a lower level of 80 mm down, the lower body member 18 has the narrowed upper portion 182 having an outer diameter D3 of about 96 mm. The narrowed lower portion 182 receives the lower end portion of the abdominal/back muscle member 19 on its cylindrical outer surface.

Accordingly, each of shoulders 173 and 183 has a radial height of 12 mm (=(120−96)/2), which is a radial depth of the annular groove 33 and is determined by (D1−D2)/2 or (D4−03)/2.

As described in U.S. Pat. No. 6,311,562 B1, the abdominal/back muscle member 19 can simulate the inclination of the human body following the movement of the base 20 and the recovery into a vertical standing position as an initial position. Therefore, the material, the thickness, the size, and the fixation should be selected taking into account repeatability as a key factor. Specifically, the abdominal/back muscle member 19 is made of an elastic material and adopts "multidirectional" fixation. The "multidirectional" fixation is a fixation such that, when an external force is applied to the base 20 in any direction, if the external force has the same magnitude, the inclination of the upper body member 17 is constant. Therefore, the pressure variation occurring in the liquid as the nucleus pulposus member 16 is also constant.

For example, the abdominal/back muscle member 19 comprises a structure of a silicone rubber cushion and has a thickness of 10 mm. The abdominal/back muscle member 19 has an annular cylindrical shape with the outer diameter Do of about 116 mm, an inner diameter of about 96 mm, and a length of about 210 mm. It is noted here that the abdominal/back muscle member 19 need not have the above-mentioned structure, and the size and material of the abdominal/back muscle member 19 in this invention are not limited to those specified in this paragraph.

Accordingly, the hood-like radial flange 31 has a radial space size of 2 mm (=(120−116)/2), which is determined by (D1−Do)/2 or (D4−Do)/2.

Figure 4:
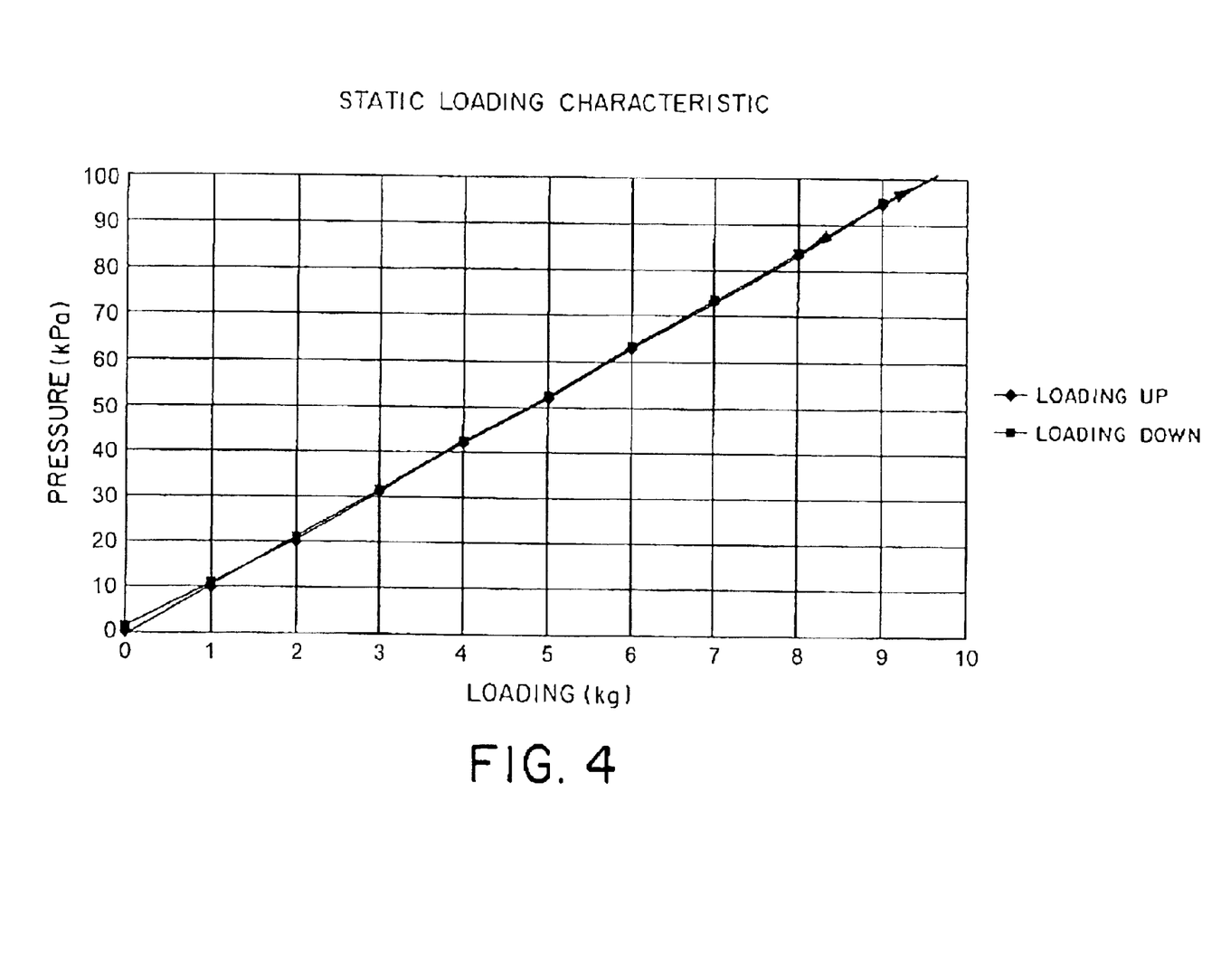
FIG. 4 shows an experimental test result of a static loading characteristic obtained from the human lumbar model structure illustrated in FIG. 3.

Using the sample of the human lumbar model structure, a loading test was carried out in the similar manner as described in U.S. Pat. No. 6,311,562 B1. The test result is shown in FIG. 4. As illustrated in FIG. 4, the pressure variation depending on loading change is constant over a range of loading force between 0–10 kg and a very good linearity. Moreover, it has less hysteresis between elevation and drop of the loading force. Particularly, it was not observed under the loading added and increased that the upper and/or lower edges of the abdominal/back muscle member 19 go over the shoulder 173 and 183 to move onto the upper portion 171 of the upper body member 17 and/or lower portion 181 of the lower body member 18. This means that the abdominal/back muscle member 19 has an internal stress distribution uniformly. It can be understood that this caused the test results having the good linearity and no hysteresis.

Next, referring to FIGS. 3 and 5, description will be made of an example of the process for assembling the human lumbar model structure 10 illustrated in FIG. 3 step by step.

The lower element 142, which is provided with the pressure sensor 21 as a pressure transducer fixed therein and the upper element 141 threaded thereonto, is inserted and fixed into the coupling hole 18a of the lower body member 18, which is secured onto the base 20 by bolts 24. The cable 23 from the pressure sensor 21 is led out through the vertical guide hole 22 in the lower body member 18 outside the base 20.

Subsequently, the annulus fibrosus member 13 is put on the upper surface or fitted into a small annulus recess in the upper surface of the lower element 142 of uper lumbar member 14 and fixed in any appropriate manner, for example, by the use of an adhesive. Thereafter, silicone grease as the artificial nucleus pulposus, i.e., the nucleus pulposus liquid 16 is fed from the above into the inner cavity of the annulus fibrosus member 13 in water.

Next, on the annulus fibrosus member 13 filled with silicone grease, the lower element 112 of the upper lumbar member 12 is mounted while the upper end of the annulus fibrosus member 13 is inserted into the annulus groove 112b of the lower element 112 (as shown by an arrow S1 illustrated in FIG. 5). The annulus fibrosus member 13 is fixed to the lower element 112 of the upper lumbar member 11 in any appropriate manner, for example, by the use of an adhesive. When a pressure transducer comprising the pressure sensor 21 is screwed from the bottom of the annulus fibrosus member 13, the silicone grease of the nucleus pulposus liquid 16 filled in the inner cavity of the annulus fibrosus member 13 rises up through the penetration path 34 and overflows the top opening of the penetration path 34 at the same time of the pressure rise. Thereafter, the upper element 111 of the upper lumbar element 11 is fitted onto the lower element 112.

However, air often invades into the nucleus pulposus liquid 16 when the lower element 112 is mounted in air. Any liquid such as water instead of the air may also be mixed in the pulposus liquid 16. The invaded air may make the pressure of the nucleus pulposus liquid 16 insensitive. After waiting until a pressure of the nucleus pulposus liquid 16 decreases from high pressure to a predetermined value, the silicone grease overflown from the top opening of the penetration path 34 is removed, and the tape 30 is adhered onto the top surface of the threaded portion 112a to close the top opening of the penetration path 34 (as shown by an arrow S2 in FIG. 5).

Then, the upper element 111 is fixedly mounted on the lower element 112 by threading the threaded hole 111a onto the threaded portion 112a of the lower element 112 of the upper lumbar member 11 (as shown by an arrow S3 in FIG. 5).

Thereafter, the abdominal/back muscle member 19 (i.e., a silicone rubber ring) is tightly fitted around the narrowed upper portion 182 of the lower body member 18. Then, the upper element 111 of upper lumbar member 11 is fitted into the coupling hole 17b of the upper body member 17. At the same time, the abdominal/back muscle member 19 is tightly fitted around the narrowed lower portion 172 of the upper body member 17. In this manner, the human lumbar model structure 10 is completed.

The human body model has been described with the cylindrical shape and specific sizes as a model in correspondence to a human body. However, even if the shape is of other than the cylindrical one or even if the total size is reduced, good measurement data can be obtained by adjusting and selecting appropriately the sizes and materials of the assembled members or elements. And those skilled in the art can readily understand these from the description of this invention.

What is claimed is:

1. A human lumbar model structure for simulating pressure applied to nucleus pulposus in the lumbar spine of a human body, said structure comprising:
    a cylindrical lumbar assembly having an upper body member, an upper lumbar member, an annulus fibrosus member, a lower lumbar member, and a lower body member, which are coaxially arranged around a common center axis and which are superposed vertically from top to bottom in this order;
    said upper body member comprising a first upper portion having a first diameter and a first lower portion having a second diameter smaller than the first diameter to form a first shoulder portion around the bound between the first upper portion and the first lower portion;
    said lower body member comprising a second upper portion having a third diameter and a second lower portion having a fourth diameter larger than the third diameter to form a second shoulder portion around the bound between the second upper portion and the second lower portion;
    said annulus fibrosus member comprising a thick cylindrical ring made of a hard elastic material and having upper and lower parts fitted into said upper and lower lumbar members, respectively, said fibrosus member having an inner cavity filled with a liquid as said nucleus pulposus;
    an abdominal/back muscle member made of an elastic material in a hollow cylindrical shape, and having an upper and lower cylindrical portion fitted onto said first lower portion of said upper body member and said second upper portion of said lower body member, respectively, so that said abdominal/back muscle surrounds and tightens said lumbar assembly over a center area extending from the first shoulder portion of said upper body member to the second shoulder portion of said lower body member, said abdominal/back muscle member having an outer diameter smaller than said first diameter and the fourth diameter; and
    a pressure sensor arranged along a center axis of said lower lumbar member in direct contact with said liquid as the nucleus pulposus for detecting the variation of the pressure of said liquid in said fibrous member.

2. A human lumbar model structure as claimed in claim 1, wherein said first diameter and said fourth diameter is larger than said outer diameter of said abdominal/back muscle member sufficiently to prevent an upper edge of the upper cylindrical portion and a lower edge of the lower cylindrical portion of said abdominal/back muscle member to go over said first shoulder and said second shoulder when the vertical loading is applied to the human lumbar model structure.

3. A human lumbar model structure as claimed in claim 1, wherein said upper lumbar member comprises an upper element fitted into a bottom surface of the first lower portion of said upper body member and a lower element fitted into a bottom surface of said upper element, the upper part of said annulus fibrosus member being fitted into a bottom surface of said lower element of said upper lumbar member, said lower element being formed with a vertical penetration path extending therethrough along a central axis connecting with the inner cavity of said fibrosus member filled with said liquid.

4. A fabricating method of the human lumbar model structure claimed in claim 3, said fabricating method comprising steps of
    tightly fitting said lower lumbar member with said pressure sensor into an upper surface of said second upper portion of said lower body member;
    tightly fitting said annulus fibrosus member to said lower lumbar member;
    filling the liquid as said nucleus pulposus into the inner cavity thereof;
    tightly fitting the lower element of said upper lumbar member to the upper portion of said annulus fibrosus member;
    making said liquid overflow from an upper opening of the penetration path of said lower element;
    tightly fitting the upper element of said upper lumbar member to the lower element of said upper lumbar member,
    tightly fitting the lower portion of said abdominal/back muscle member onto the second upper portion of said lower body member; and
    tightly fitting said upper body member to the upper element of said upper lumbar member, while the first lower portion of said upper body member being fitted into the upper portion of said abdominal/back muscle member.

5. A fabricating method as claimed in claim 4, after making said liquid overflow from the upper opening of the penetration path of said lower element and before tightly fitting the upper element to the lower element of said upper lumbar member, further including steps of:

confirming a pressure of said liquid at a predetermined pressure value;

removing an overflowed liquid around the top opening of said lower element of said upper lumbar member; and closing the top opening with a tape.

\* \* \* \* \*